United States Patent
Amans

(10) Patent No.: US 12,542,120 B2
(45) Date of Patent: Feb. 3, 2026

(54) CARDIAC AND VASCULAR NOISE CANCELLATION FOR PULSATILE TINNITUS

(71) Applicant: The Regents of the University of California, Oakland, CA (US)

(72) Inventor: Matthew Amans, San Francisco, CA (US)

(73) Assignee: The Regents of the University of California, Oakland, CA (US)

( * ) Notice: Subject to any disclaimer, the term of this patent is extended or adjusted under 35 U.S.C. 154(b) by 270 days.

(21) Appl. No.: 18/273,302

(22) PCT Filed: Jan. 20, 2022

(86) PCT No.: PCT/US2022/013057
§ 371 (c)(1),
(2) Date: Jul. 20, 2023

(87) PCT Pub. No.: WO2022/159541
PCT Pub. Date: Jul. 28, 2022

(65) Prior Publication Data
US 2023/0410782 A1    Dec. 21, 2023

Related U.S. Application Data

(60) Provisional application No. 63/139,505, filed on Jan. 20, 2021.

(51) Int. Cl.
G10K 11/178    (2006.01)
A61B 5/024    (2006.01)
H04R 25/00    (2006.01)

(52) U.S. Cl.
CPC ........ *G10K 11/17823* (2018.01); *A61B 5/024* (2013.01); *G10K 11/17873* (2018.01);
(Continued)

(58) Field of Classification Search
CPC ............ A61B 2562/0204; A61B 5/024; G10K 2210/116; G10K 2210/1081; G10K 11/346; G10K 2210/129
See application file for complete search history.

(56) References Cited

U.S. PATENT DOCUMENTS 7,876,906 B2    1/2011 Abolfathi
2008/0013747 A1    1/2008 Tran
(Continued)

FOREIGN PATENT DOCUMENTS

WO    2020188415 A1    9/2020

OTHER PUBLICATIONS

Extended European Search Report issued in corresponding application EP 22743140.0 dated Nov. 21, 2024 (11 pages).
(Continued)

*Primary Examiner* — Kile O Blair
(74) *Attorney, Agent, or Firm* — Carter, DeLuca & Farrell LLP; Vadim Vapnyar

(57) ABSTRACT

A system for cancelling an internally generated noise includes a processing device disposed on a patient. The processing device includes a sensor configured to record a pulse sound waveform generated by a pulse of the patient and at least one waveform processing circuit configured to output a cancellation sound waveform based on the recorded pulse sound waveform. The system also includes a sound output device coupled to the processing device. The sound output device is configured to output the cancellation sound waveform to cancel or minimize the pulse sound waveform corresponding to the internally generated noise.

19 Claims, 2 Drawing Sheets

(52) U.S. Cl.
CPC ....... *H04R 25/75* (2013.01); *G10K 2210/116* (2013.01); *G10K 2210/3011* (2013.01); *G10K 2210/3016* (2013.01); *G10K 2210/3027* (2013.01); *G10K 2210/3028* (2013.01); *G10K 2210/3044* (2013.01)

(56) References Cited

U.S. PATENT DOCUMENTS

| | | |
|---|---|---|
| 2008/0064993 A1 | 3/2008 | Abolfathi et al. |
| 2009/0099408 A1 | 4/2009 | Abolfathi et al. |
| 2017/0301337 A1 | 10/2017 | Golani et al. |
| 2018/0271710 A1 | 9/2018 | Boesen et al. |
| 2020/0008708 A1 | 1/2020 | Tan et al. |

OTHER PUBLICATIONS

International Search Report and Written Opinion of the International Searching Authority issued in corresponding application PCT/US2022/013057 mailed Apr. 13, 2022 (9 pages).

CARDIAC AND VASCULAR NOISE CANCELLATION FOR PULSATILE TINNITUS

CROSS REFERENCE TO RELATED APPLICATIONS

The present application is a U.S. National Stage Application filed under 35 U.S.C. § 371(a) of International Patent Application No. PCT/US2022/013057, filed on Jan. 20, 2022, which claims the benefit of and priority to U.S. Provisional Application No. 63/139,505, filed on Jan. 20, 2021. The entire disclosures of the foregoing applications are incorporated by reference herein.

BACKGROUND

Pulsatile tinnitus is the sensation of rhythmic sound, similar to the heartbeat, that is often pulse synchronous, but does not have an external source. Sometimes the source of this sound cannot be located. Various blood vessel abnormalities result in vascular turbulence, which in turn, results in sound generation responsible for pulsatile tinnitus. Pulsatile tinnitus is rhythmic and accounts for about 10% of tinnitus patients. A common mechanism of sound generation is attributed to flow patterns in blood vessels near the cochlea, the sound sensing cavity of the inner ear.

In particular, pulsatile tinnitus may be caused by abnormal pulse-synchronous blood flow in vascular structures disposed near the cochlea, such as, transverse sinus, sigmoid sinus and internal jugular vein ("SSIJ"). The vascular structures with abnormal flow may be either venous or arterial. Approximately 40% of pulsatile tinnitus etiologies are due to abnormal venous flow, approximately 35% are due to arterial abnormalities, with the remainder of the cases being unidentified.

Approximately 3-5 million Americans have pulsatile tinnitus and estimated 30-40% of them do not have a treatable or identifiable cause. Many patients with pulsatile tinnitus have a source of sound generation inside of their blood vessels that is not easy to identify. Furthermore, there are few available treatments for pulsatile tinnitus. Thus, there is a need for systems and methods to treat pulsatile tinnitus and other disorders responsible for sound generation.

SUMMARY

The present disclosure provides a system configured to generate a processed sound waveform that is configured to cancel the sound generated by pulsatile tinnitus or any other internally generated noise. The system may include a microphone and/or a heartrate monitor that is configured to monitor the heartbeat, pulse, and/or sound generated from the blood vessels. The system also includes a processing device configured to generate a cancellation sound waveform based on the pulse signal derived from the heartbeat, blood flow, and/or pulse sound. The processing device applies a time delay to a pulse sound waveform, filters the pulse sound waveform, and inverts the pulse sound waveform to obtain a 180° phase inverted signal. The phase inverted signal is then amplified to form the cancellation sound waveform, which is supplied to one or more headphones, or an implantable device. The cancellation sound waveform, due to its properties, i.e., delayed, filtered, inverted, etc., is configured to cancel the sound generated by pulsatile tinnitus, thus alleviating patient's symptoms.

According to one embodiment of the present disclosure, a system for cancelling an internally generated noise is disclosed. The system includes a processing device disposed on a patient. The processing device includes a sensor configured to record a pulse sound waveform generated by a pulse of the patient and at least one waveform processing circuit configured to output a cancellation sound waveform based on the recorded pulse sound waveform. The system also includes a sound output device coupled to the processing device. The sound output device is configured to output the cancellation sound waveform to cancel or minimize the pulse sound waveform corresponding to the internally generated noise.

Implementations of the above embodiment may include one or more of the following features. According to one aspect of the above embodiment, the sensor is an acoustic sensor. According to another aspect of the above embodiment, the sensor may be an ultrasound sensor, which may optionally use Doppler effect to measure blood flow. According to another aspect of the above embodiment, the sensor may be photoplethysmography-based or use any other technology to measure blood flow, the sounds of blood flow, or turbulence. The waveform processing circuit includes a time delay circuit configured to shift the recorded pulse sound waveform by a predetermined time period. The sensor may also further include a heartrate monitor configured to detect cardiac output. The time delay circuit is further configured to calculate the time delay based on the cardiac output.

The waveform processing circuit may also include a filter circuit configured to block at least one frequency of recorded pulse sound waveform. The waveform processing circuit may also include an inversion circuit configured to invert the recorded pulse sound waveform by about 180° to be out of phase with the pulse sound waveform. The waveform processing circuit may further include an amplifier circuit configured to amplify the recorded pulse sound waveform.

The processing device further includes a controller having one or more waveform processing circuits. The processing device is configured to execute a machine learning algorithm for adjusting at least one property of the cancellation sound waveform. The processing device may further include a user interface configured to control the processing device. The system may further include a computing device coupled to the processing device, such that the computing device is configured to control the processing device.

According to another embodiment of the present disclosure, a method for cancelling an internally generated noise is disclosed. The method includes recording a pulse sound waveform generated by a pulse of the patient at a sensor disposed on the patient. The method also includes generating a cancellation sound waveform using at least one waveform processing circuit based on the recorded pulse sound waveform. The method further includes outputting the cancellation sound waveform at a sound output device to cancel or minimize the pulse sound waveform corresponding to the internally generated noise.

Implementations of the above embodiment may include one or more of the following features. According to one aspect of the above embodiment, generating the cancellation sound waveform may further include shifting the recorded pulse sound waveform by a predetermined time period. The time period may be shifted based on heartrate or cardiac output. Generating the cancellation sound waveform may further include blocking at least one frequency of recorded pulse sound waveform. Generating the cancellation sound waveform may further include inverting the recorded pulse sound waveform by about 180° to be out of phase with the pulse sound waveform. Generating the cancellation sound waveform may further include amplifying the recorded pulse sound waveform. The method may further include executing a machine learning algorithm that is configured to adjust at least one property of the cancellation sound waveform. The method may further include adjusting the property of the cancellation sound waveform through a user interface.

According to another embodiment of the present disclosure, sound of pulsatile tinnitus is detected by a wearable device positioned in, on, or around the region of the ear. The sound from a separate sensor can be adjusted using machine learning, or other automated method, to match that which is detected near the ear. A sensor to detect blood flow in, on, or around the ear may also be used to adjust using machine learning, or other automated method, the time delay imposed upon a vascular sound measured elsewhere. The wave is then inverted to cancel internally generated noise. The sound measured from the sensor near the ear may also be used as the source of the waveform for sound cancellation.

BRIEF DESCRIPTION OF THE DRAWINGS

Embodiments of the present disclosure are described herein with reference to the accompanying drawings, wherein.

DETAILED DESCRIPTION

Figure 1:
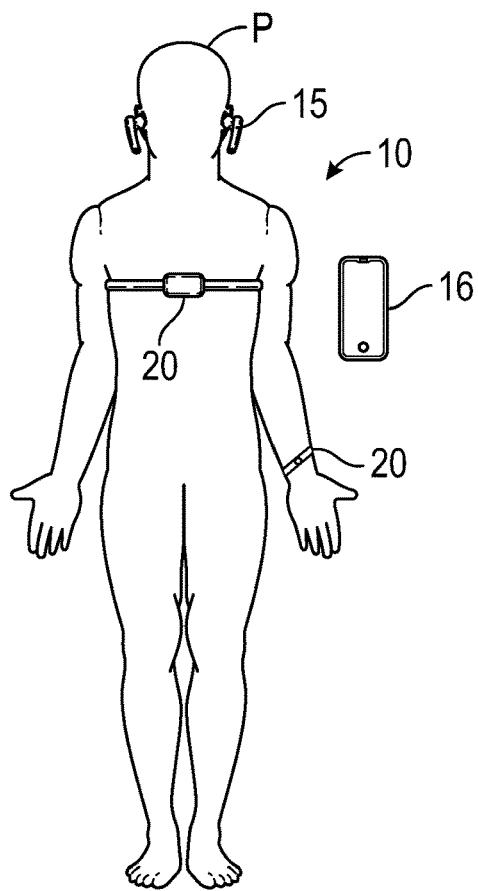
FIG. 1 is a schematic diagram of a system for cardiac noise cancellation to treat pulsatile tinnitus according to one embodiment the present disclosure.

Embodiments of the present disclosure are described in detail with reference to the drawings, in which like reference numerals designate identical or corresponding elements in each of the several views. As used herein the term "proximal" refers to the portion of a device that is closer to the user, while the term "distal" refers to the portion that is farther from the user. The term "about" denotes a range of ±5% from the stated value.

FIG. 1 shows a system 10 for cancelling the sound generated by pulsatile tinnitus. The system 10 includes a processing device 20 that is connected to one or more sound output devices 15. The sound output device 15 may be any suitable headphone or earpiece disposed in and/or over the ear of the patient "P." The sound output device 15 may also be a cochlear implant or any other hearing aide.

The processing device 20 may be a wearable device worn about a wrist, ankle, chest, or any other body portion of a patient "P". The processing device 20 may be attached to the patient "P" using a band or an adhesive bandage (not shown), such that the processing device 20 is in physical contact with the patient "P" allowing for measurement and processing of heartbeat or pulse by measuring the sound and/or heartrate.

Figure 3:
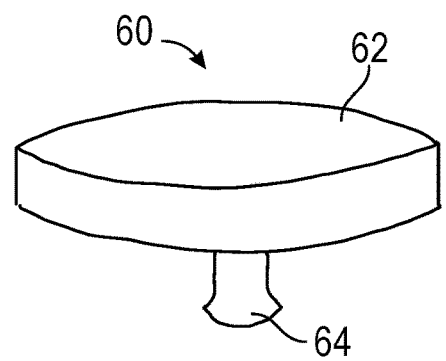
FIG. 3 is a schematic diagram of a processing device of the system of FIG. 1 according to one embodiment of the present disclosure.
Figure 2:
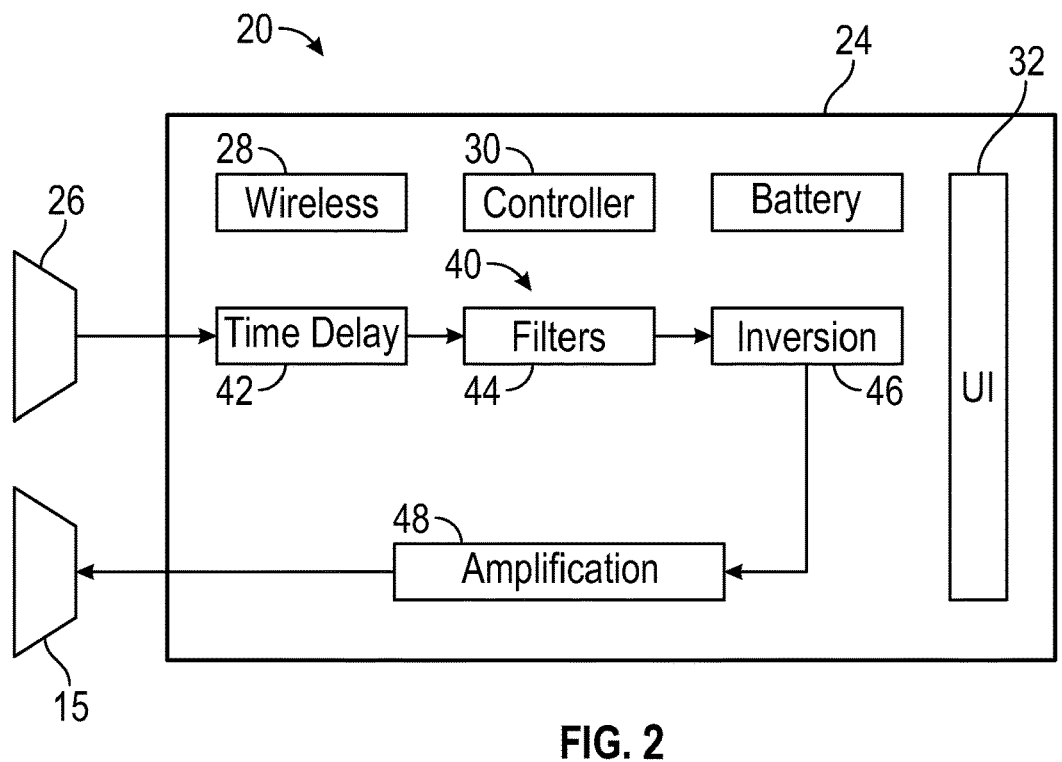
FIG. 2 is a perspective view of a wearable transducer assembly according to one embodiment the present disclosure.

With reference to FIG. 3, the processing device 20 includes a housing 24 enclosing electronic components (e.g., battery). The housing 24 may be waterproof to prevent moisture from penetrating into the interior of the housing 24.

The processing device 20 includes a sensor 26 that may be disposed within the housing 24 such that a portion of the sensor 26 is in contact with the patient "P." In embodiments, the sensor 26 may be a separate unit that is coupled to the processing device 20 via a wired or a wireless interface.

Figure 4:
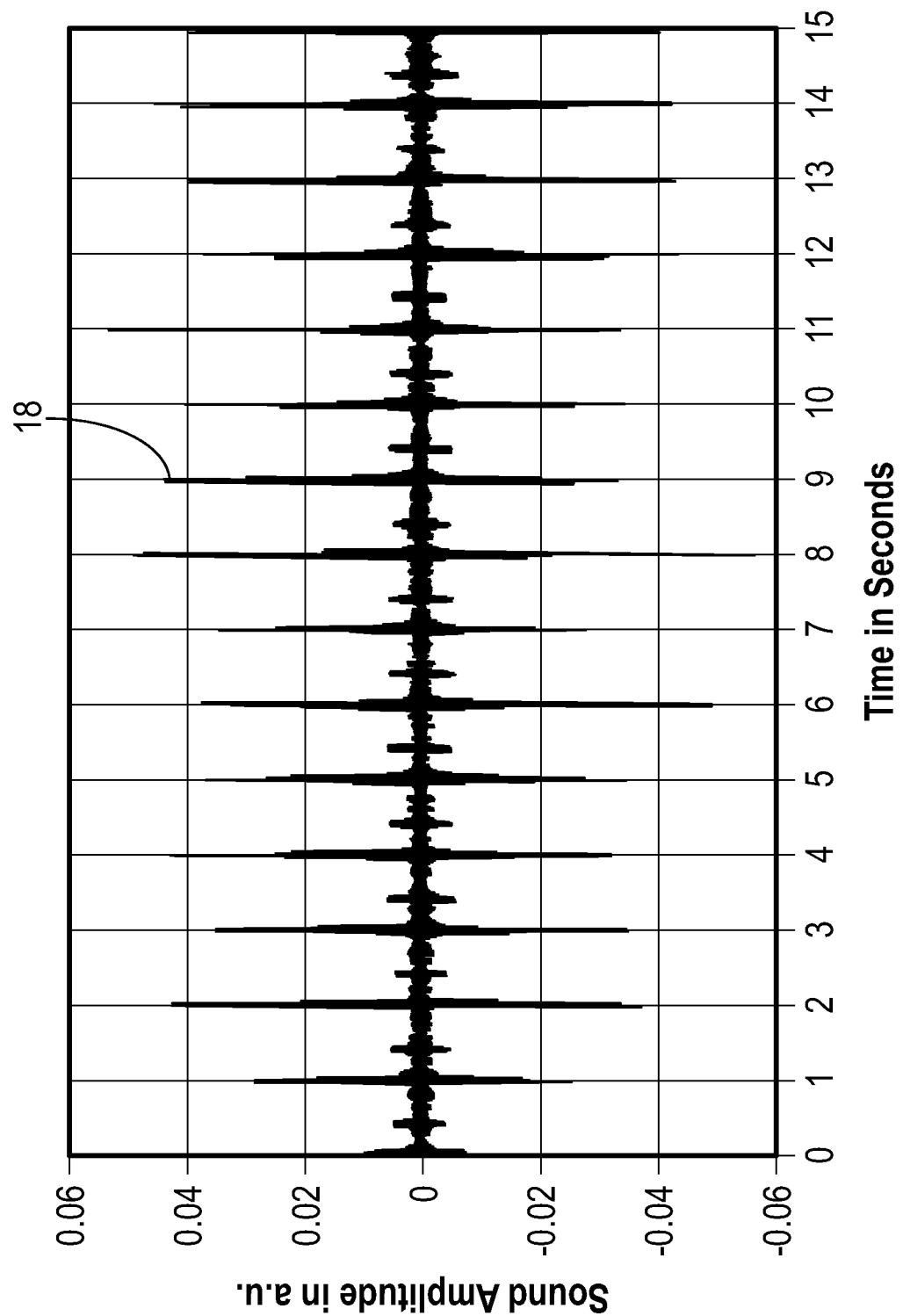
FIG. 4 is a plot of a sound waveform generated by pulsatile tinnitus.

The sensor 26 may be an acoustic sensor, such as a microphone or any other type of acoustic transducer configured to measure sound, such as a flexible membrane transducer, a micro-electromechanical systems (MEMS) microphone, an electret diaphragm microphone, ultrasound transducer, or any other microphone. The sensor 26 may be disposed on the chest of the patient "P" to allow for measuring the sound generated by the pulse of the patient "P" close to the heart. The sensor 26 may be disposed on the wrist of the patient "P", in, on or around the ear of the patient "P", or any other body part from which vascular or cardiac sound can be determined. The sensor 26 records a sound waveform signal 18 (FIG. 4) corresponding to the pulse of the patient "P." In embodiments, multiple sensors 26 may be used at different locations throughout the body of the patient "P".

According to another embodiment, the sensor 26 may be an ultrasound device configured to measure the blood flow and generate a sound waveform using Doppler effect or any other suitable ultrasound technique. The sensor 26 may also be any other suitable transducer, such as an optical transducer, capable of measuring normal blood flow and transmitting blood flow sounds in the absence of turbulence.

The processing device 20 also includes a controller 30, which may be any suitable processor (e.g., control circuit) adapted to perform the operations, calculations, and/or set of instructions described in the present disclosure including, but not limited to, a hardware processor, a field programmable gate array (FPGA), a digital signal processor (DSP), a central procardicessing unit (CPU), a microprocessor, and combinations thereof. Those skilled in the art will appreciate that the processor may be substituted by any logic processor (e.g., control circuit) adapted to execute algorithms, calculations, and/or set of instructions described herein.

The controller 30 may also include a memory, which may include one or more of volatile, non-volatile, magnetic, optical, or electrical media, such as read-only memory (ROM), random access memory (RAM), electrically-erasable programmable ROM (EEPROM), non-volatile RAM (NVRAM), or flash memory. The controller 30 and the memory device may be any standard processor and memory component known in the art.

The processing device 20 also includes a wireless interface 28, which may include an antenna and any other suitable transceiver circuitry configured to communicate with external devices (e.g., sensor 26) using wireless communication protocols. Wireless communication may be achieved via one or more wireless configurations, e.g., radio frequency, optical, Wi-Fi, ANT+, BLUETOOTH®, (an open wireless protocol for exchanging data over short distances, using short length radio waves, from fixed and mobile devices, creating personal area networks (PANs), ZIGBEE® (a specification for a suite of high level communication protocols using small, low-power digital radios based on the IEEE 802.15.4-2003 standard for wireless personal area networks (WPANs)), and the like.

The processing device 20 may also include a user interface 32, having a display, i.e., a touchscreen and/or one or more buttons, which allows for the user to control operating of the processing device 20. In certain embodiments, the system 10 may include a computing device 16 (FIG. 1), such as a handheld device having a touchscreen and an application for controlling the processing device 20 thereby replicating the functionality of the user interface 32.

The processing device 20 also includes one or more waveform processing circuits 40, which may be discrete components or may be configured as a single circuit. The waveform processing circuits 40 may be analog or digital circuits, which may be embodied in the controller 30. The sound waveform signal 18 may be digitized by using any suitable method, such as Fourier transform algorithms. The processing device 20 may include any suitable electronic components, such as analog-to-digital (A/D) converters to digitize the sound waveform signal 18. Furthermore, while the sequence of the signal processing, namely, of the sound waveform, is described below in a certain order, it is envisioned that signal processing steps may be modified to output a desired cancellation waveform.

One of the waveform processing circuits 40 is a time delay circuit 42 that is configured to shift the sound waveform signal 18 by a set amount of time, which may be from about 10 ms to about 1,000 ms to account for the time delay between the time the pulse is generated to the time the pulse is heard by the patient "P," i.e., time for blood to travel from the heart to the blood vessels disposed near the cochlea. The adjustment period may be input by the user through the user interface 32 or the computing device 16. The time delay may be based on cardiac output, which may be measured by a heartrate monitor or any other suitable sensor. The time delay may also be determined using an additional acoustic sensor positioned on, in or around the ear that can detect blood flow, pulse, or sound. The additional sensor may be disposed within the sound output device 15. The additional sensor may be a blood flow sensor or an acoustic sensor as described above. The delay between the source of the blood flow sound that is used to cancel the tinnitus may in part be determined based on the time delay between the blood flow sound signal in, on or around the ear and the blood flow sound signal obtained from the sensor 26 used to cancel the tinnitus.

The delayed sound waveform signal is then further processed through a filtering circuit 44 configured to pass frequencies that are heard by the patient "P" and to block the frequencies outside the audible range responsible for pulsatile tinnitus. The filtering circuit 44 may include one or more of the following filters: high pass, low pass, band pass, notch filters and/or digital equivalents thereof. Thus, the filtering circuit 44 is configured to adjust the pitch of the sound waveform.

The filtered sound waveform signal is then inverted through an inversion circuit 46. The inversion circuit 46 may be a phase splitter or an inverting amplifier, or digital equivalents thereof. This inversion circuit 46 generates an inverted sound waveform signal which is about 180° out of phase with the sound waveform signal 18. The inverted sound waveform may be amplified through an amplifier circuit 48 to match the amplitude of the sound waveform signal 18 as heard by the patient "P." The amplitude may be adjusted by the user through the user interface 32 or the computing device 16. Adjustments to amplitude control of the volume of the inverted sound waveform.

The processing device 20 outputs a cancellation sound waveform, i.e., filtered, time delayed, inverted, and amplified variant of the recorded pulse sound, which is configured to cancel the sound of pulsatile tinnitus. The cancellation sound waveform is then output through the sound output device 15 and cancels and/or reduces the sound generated by pulsatile tinnitus due to destructive interference of the two waveforms, namely, interference between the waveform generated by the blood flow and the cancellation sound waveform. The process of generating the cancellation waveform is done in real-time, such that the processing steps are performed with little to no perceptible delay (i.e., within from about 1 ms to about 100 ms after the heartbeat sound is recorded by the sensor 26). Signal processing steps may be performed in any suitable order to generate and output the cancellation sound waveform that aligns with the waveform generated by the pulsatile tinnitus.

During initial setup of the system 10, the patient "P" attaches the processing device 20 and in particular the sensor 26, to the location suitable for measuring the sound generated by the pulse of the patient "P." The patient "P" also connects the sound output device 15 to the processing device 20. This may include connecting a cable from the sound output device 15 or establishing a wireless connection, i.e., pairing, the sound output device 15 to the processing device 20. In embodiments, where the computing device 16 is part of the system 10, the processing device 20 may be also paired to the computing device 16 to enable communication with the application running on the computing device 16.

Once the initial setup is completed, the processing device 20 is configured to output the processed sound waveform. The patient "P" may adjust properties of the cancellation sound waveform, including time delay, filter range(s), and amplitude. The adjustments may be done manually using the user interface 32 and/or the computing device 16. In embodiments adjustments may be done automatically by the processing device 20 and/or the computing device 16 using an algorithm that is configured to achieve optimal (e.g., maximum) cancelation of the sound generated by blood flow. It is envisioned that there may be an ongoing training of the processing device 20 to automatically adjust the waveform using artificial intelligence after the initial adjustment of the cancellation sound waveform.

The terms "artificial intelligence," "data models," or "machine learning" may include, but are not limited to, neural networks, convolutional neural networks (CNN), recurrent neural networks (RNN), generative adversarial networks (GAN), Bayesian Regression, Naive Bayes, nearest neighbors, least squares, means, and support vector regression, among other data science and artificial science techniques.

A neural network may be used to train the processing device 20. In various embodiments, the neural network may include a temporal convolutional network, with one or more fully connected layers, or a feed forward network. In various embodiments, training of the neural network may happen on a separate system, e.g., graphic processor unit ("GPU") workstations, high performing computer clusters, etc., and the trained algorithm would then be deployed on the processing device 20. In further embodiments, training of the neural networks may happen locally, e.g., on the processing device 20. After training, the processing device 20 may include a software application that is executable by the controller 30 to adjust the cancellation sound waveform.

In embodiments, the sensor 26 may be a heartrate monitor such as an electrocardiography ("ECG") sensor. The ECG sensor is configured to measure electrical activity of the heart and is disposed on the chest of the patient "P". The sensor 26 may be a photoplethysmography-based sensor which uses optical sensors to detect volume of blood flow. Since the optical sensor 26 measures blood flow, the sensor 26 may be placed at any suitable location having sufficient blood flow. In this case, the processing device 20 is configured to generate a cancellation sound waveform based on the heartbeat waveform, since the heartbeat waveform correlates to the sound waveform generated by the pulse.

With reference to FIG. 3, the system 10 may also include additional devices configured to couple to the processing device 20 and/or computing device 16. In particular, the system 10 may include a transducer assembly 60 having a housing 62, which may enclose the sensor 26 as well as other components of the processing device 20, such as a driver circuit, a transmitter, etc. The transducer assembly 60 may include a post 64 or other attachment means configured to secure the transducer assembly 60 to a band worn around the patient's wrist (e.g., watchband of an Apple Watch®). The transducer assembly 60 may be positioned on the underside of the watchband, such that the transducer assembly 60 is positioned over the artery.

It will be appreciated that of the above-disclosed and other features and functions, or alternatives thereof, may be desirably combined into many other different systems or applications. Various presently unforeseen or unanticipated alternatives, modifications, variations or improvements may be subsequently made by those skilled in the art which are also intended to be encompassed by the following claims. Unless specifically recited in a claim, steps or components of claims should not be implied or imported from the specification or any other claims as to any particular order, number, position, size, shape, angle, or material.

What is claimed is:

1. A system for cancelling an internally generated noise, comprising:
    a processing device disposed on a patient, the processing device including:
        a sensor configured to record a pulse sound waveform generated by a pulse of the patient wearing the processing device; and
        at least one waveform processing circuit configured to output a cancellation sound waveform based on the recorded pulse sound waveform, wherein the at least one waveform processing circuit includes a time delay circuit configured to shift the recorded pulse sound waveform by a predetermined time period to account for a time delay between a time the pulse is generated to a time the pulse is heard by the patient; and
    a sound output device coupled to the processing device, the sound output device configured to output the cancellation sound waveform to cancel or minimize the pulse sound waveform corresponding to the internally generated noise.

2. The system according to claim 1, wherein the sensor is at least one of an acoustic sensor or an ultrasound sensor.

3. The system according to claim 1, wherein the sensor further includes a heartrate monitor configured to detect cardiac output.

4. The system according to claim 3, wherein the time delay circuit is configured to calculate a time delay based on the cardiac output.

5. The system according to claim 1, wherein the at least one waveform processing circuit includes a filtering circuit configured to block at least one frequency of recorded pulse sound waveform.

6. The system according to claim 1, wherein the at least one waveform processing circuit includes an inversion circuit configured to invert the recorded pulse sound waveform by about 180° to be out of phase with the pulse sound waveform.

7. The system according to claim 1, wherein the at least one waveform processing circuit includes an amplifier circuit configured to amplify the recorded pulse sound waveform.

8. The system according to claim 1, wherein the processing device further includes a controller having the at least one waveform processing circuit.

9. The system according to claim 8, wherein the processing device is configured to execute a machine learning algorithm for adjusting at least one property of the cancellation sound waveform.

10. The system according to claim 1, wherein the processing device further includes a user interface configured to control the processing device.

11. The system according to claim 10, wherein the predetermined time period is adjustable through the user interface.

12. The system according to claim 1, further comprising:
    a computing device coupled to the processing device, the computing device configured to control the processing device.

13. The system according to claim 1, wherein the predetermined time period is from 10 ms to 1000 ms.

14. A method for cancelling an internally generated noise, comprising:
    recording a pulse sound waveform generated by a pulse of a patient at a sensor disposed on the patient wearing a processing device;
    generating a cancellation sound waveform using at least one waveform processing circuit based on the recorded pulse sound waveform, wherein the at least one waveform processing circuit includes a time delay circuit configured to shift the recorded pulse sound waveform by a predetermined time period to account for a time delay between a time the pulse is generated to a time the pulse is heard by the patient; and
    outputting the cancellation sound waveform at a sound output device to cancel or minimize the pulse sound waveform corresponding to the internally generated noise.

15. The method according to claim 14, wherein generating the cancellation sound waveform further includes blocking at least one frequency of recorded pulse sound waveform.

16. The method according to claim 14, wherein generating the cancellation sound waveform further includes inverting the recorded pulse sound waveform by about 180° to be out of phase with the pulse sound waveform.

17. The method according to claim 14, wherein generating the cancellation sound waveform further includes amplifying the recorded pulse sound waveform.

18. The method according to claim 14, further comprising:
    executing a machine learning algorithm that is configured to adjust at least one property of the cancellation sound waveform.

19. The method according to claim 14, further comprising:
    adjusting at least one property of the cancellation sound waveform through a user interface.

* * * * *